United States Patent Office 3,433,799
Patented Mar. 18, 1969

3,433,799
CHLORINATED PARABANIC ACIDS
Ludwig Konrad Huber, Philadelphia, Pa., assignor to Pennsalt Chemicals Corporation, Philadelphia, Pa., a corporation of Pennsylvania
No Drawing. Filed Oct. 11, 1965, Ser. No. 494,907
U.S. Cl. 260—309.5
Int. Cl. C07d 49/30; A61l 13/00
4 Claims

ABSTRACT OF THE DISCLOSURE

Chlorinated parabanic acids, useful as bleaching, sanitizing, oxidizing and chlorinating agents, are provided having the formula

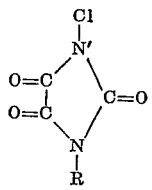

where R is chlorine, hydrogen or hydroxymethyl.

---

This invention relates to novel chlorinated parabanic acids and to methods for their preparation.

Particularly the invention relates to compounds having the formula

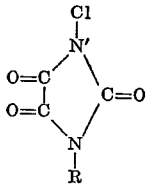

wherein R is chlorine, hydrogen or hydroxymethyl.

Still more particularly the invention relates to N-chloroparabanic acid; N,N'-dichloroparabanic acid; and N-hydroxymethyl-N'-chloroparabanic acid.

The compounds of this invention are prepared by reacting parabanic acid with a compound providing chlorine atoms. Parabanic acid is represented by the formula

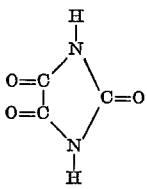

It is also described in the chemical literature as imidazoletrione, imidazolidinetrione, and oxalylurea.

N-chloroparabanic acid and N,N'-dichloroparabanic acid can be prepared by reacting parabanic acid with a positive-chlorine-atom providing compound, e.g., a lower alkyl hypochlorite, preferably t-butyl hypochlorite. These compounds can also be prepared by chlorinating parabanic acid in an inert liquid medium, preferably an organic liquid substantially inert to chlorination directly with elemental chlorine, and preferably in the presence of a hydrogen chloride acceptor, e.g., sodium carbonate.

N-hydroxymethyl-N'-chloroparabanic acid is prepared by reacting parabanic acid dissolved in methanol with t-butyl hypochlorite or other lower alkyl hypochlorite.

The chlorinated parabanic acids have a high available chlorine content (ranging from about 40 to 77% by weight) which is readily released as active chlorine when they are placed in water. They have good solubility in water and in various organic solvents. These properties make the compounds, when used in an amount sufficient to obtain the desired result (as can be readily determined from known practice with similar agents) useful as bleaching agents, sanitizing agents, oxidizing agents and chlorinating agents. Chlorinated parabanic acids are especially useful for the bleaching and sanitizing of cotton and other textile materials in fiber, web or garment form, and for general sanitizing purposes, e.g., for sanitizing treatment of water in swimming pools.

N,N'-dichloroparabanic acid is highly stable to shock, to heat and to package storage conditions despite its high (77%) available chlorine content. N-chloroparabanic acid and N-hydroxymethyl-N'-chloroparabanic acid are similarly highly stable.

N-hydroxymethyl-N'-chloroparabanic acid is unusual in having a combination of a reducing alcoholic group (—CH$_2$OH) with an oxidizing group (=N'Cl) in the same molecule. It decomposes spontaneously with a mild explosive force when it is heated to about 135° C. In addition to its other uses, it can be used as a thermoexplosive compound. It also can be used in a thermoexplosive composition with other explosive materials either in minor amount as an igniter, or in major amount as a principal explosive.

The invention can be further understood from the following examples:

Example 1.—Preparation of N,N'-dichloroparabanic acid 15 g. (0.15 mole) t-butyl hypochlorite were added to 4.4 g. of pure parabanic acid (0.04 mole). Thereupon, the temperature rose from 24 to 38° C., and the reaction mixture was converted to a homogeneous suspension. The reaction mixture was stirred for 3 hours at room temperature to insure complete reaction. Then the liquids were distilled off under reduced pressure and at room temperature. The yield was 7.1 g. colorless solid (98% by weight of theory of N,N'-dichloroparabanic acid based on parabanic acid), having M.P. 239–240° C. with decomposition.

Calculated: C$_3$Cl$_2$N$_2$O$_3$: 19.7% C; 0.0% H; 15.3% N; 77.5% available chlorine. Found: 20.5% C; 0.3% H; 15.2% N; 77.7% available chlorine.

The infrared spectrum showed absorption in the following region (in cm.$^{-1}$):

3597 w., 3205 w., 2703 w., 2463 w., 2421 w., 2278 w., 2123 w., 1934 w., 1859 m., 1808 s. (C=O), 1764 v.s. (C=O), 1595 w., 1548 w., 1350 s. (—N—C—N), 1321 m., 1312 m., 1297 m., 1267 m., 1205 w., 1140 s., 1124 m., 976 w., 961 m. (—N—C—N), 817 m. (—C=O), 779 w., 718 s. (—N—Cl), 653 m. (w=weak, m=medium, s= strong, v=very).

N,N'-dichloroparabanic acid dissolves readily in water (with release of active chlorine), and was found to be very soluble in benzene, acetone, dimethylformamide and ether.

For stability tests, samples of N,N'-dichloroparabanic acid were stored in closed containers protected from light. After storage for 22 weeks at 20–30° C. the available chlorine dropped from 77% to 72%. The available chlorine content of samples stored at about 5° C. for about one year remained practically unchanged at the low tempearture.

Example 2.—Preparation of N,N'-dichloroparabanic acid with elemental chlorine 2.3 g. parabanic acid (0.02 mole) were dissolved in about 32 g. acetone. 7.1 g. sodium bicarbonate (0.08 m.) were added, and a slow stream of chlorine then was passed through the dispersion mass at 5° C. for about half an hour. The reaction mass then were filtered. The acetone was evaporated from the mass under reduced pressure. 2.6 g. (72% by weight of theory) of N,N'-dichloroparabanic acid was recovered as product.

Calculated: $C_3Cl_2N_2O_3$: 77.5% available chlorine. Found: 67% available chlorine.

Example 3.—Preparation of N-chloroparabanic acid 0.25 g. parabanic acid (0.002 mole) was suspended in about 1 ml. water. After the mass was cooled in ice, a slow stream of chlorine was passed through the mixture for 15 minutes. The solids were recovered and dried under high vacuum. Upon analysis, the product was found to contain about 21% available chlorine. From the mother liquid, two more fractions were obtained which had an available chlorine content of 8% and 11% respectively.

Example 4.—Further preparation of N-chloroparabanic acid 2.9 g. parabanic acid (0.025 mole) were dissolved in 30 ml. acetone. 5.3 g. anhydrous sodium carbonate (0.05 mole) were added. The mass then was chlorinated at 0–5° C. until the weight increase corresponded to 1 mole chlorine per mole of parabanic acid. Then the reaction mass was filtered, and the solvent evaporated under reduced pressure. N-chloroparabanic acid was recovered as a colorless solid which melts at 146–148° C. with decomposition.

Calculated: $C_3HClN_2O_3$: 24.3% C; 0.7% H; 18.9% N; 47.8% available chlorine. Found: 24.5% C; 1.1% H; 19.1% N; 47.9% available chlorine.

The possibility of a 1:1 mixture of N,N-dichloroparabanic acid and parabanic acid was excluded by extracting the product with benzene, which is a good solvent for N,N'-dichloroparabanic acid but not for parabanic acid. No change was effected by benzene extraction.

The infrared spectrum for the N-chloroparabanic acid shows absorption at the following wave numbers (cm.$^{-1}$): 3546 w., 3247 m. (—NH), 2717 w., 2451 v.w., 1984 v.w., 1825 m. (C=O), 1802 s. (C=O), 1761 v.s. (C=O), 1577 w., 1377 s. (—N—C—N), 1351 s., 1321 s., 1156 w., 1129 m., 1075 m., 1065 m., 917 m. (—N—C—N), 908 m., 817 v.w., 798 w., 737 s. (C=O), 718 m. (—N—Cl), 662 s. (ring vibration).

N-chloroparabanic acid is soluble in water with release of active chlorine. It is very soluble in acetone and ethanol.

Example 5.—Preparation of N-hydroxymethyl-N'-chloroparabanic acid 5.7 g. parabanic acid (0.05 mole) were dissolved in about 50 ml. methanol, and t-butyl hypochlorite was added dropwise at 5° C. When about 0.08 mole t-butyl hypochlorite was added, much colorless solid was found to have formed. More t-butyl hypochlorite was then added. After additional stirring at 50° C., the solids were filtered off and dried under high vacuum. About 1 g. of N-hydroxymethyl-N'-chloroparabanic acid was recovered in the form of a colorless solid which melts at about 128° C. and makes a mild explosion when heated further to about 132–134° C.

Calculated: $C_4H_3ClN_2O_4$: 26.9% C, 1.7% H, 15.7% N, 39.7% available chlorine. Found: 26.6% C, 0.7% H, 15.4% N, 39.3% available chlorine.

The infrared spectrum for N-hydroxymethyl-N'-chloroparabanic acid shows absorption at the following wave numbers (cm.$^{-1}$): 3425 w., 3289 s. (OH), 3257 s. (OH), 2667 v.w., 1745 v.s. (C=O), 1709 v.s. (C=O), 1531 m., 1504 s. (—C—N), 1439 s. (—N—C—N), 1404 s. (ring vibration), 1323 s. (—CH$_2$), 1208 v.s. (—C—O—), 1181 s., 1166 m., 1152 m., 1008 m., 966 m. (—N—C—N), 909 m., 860 m., 822 m., 793 m., 750 s. (—C=O), 727 m. (—N—Cl).

N-hydroxymethyl-N'-chloroparabanic acid is soluble in water with release of active chlorine. It is very soluble in acetone and ethanol.

Many different embodiments of this invention can be made without departing from the scope and spirit thereof, and it is to be understood that my invention includes such embodiments and is not to be limited by the above description.

I claim:
1. Chlorinated parabanic acid having the formula

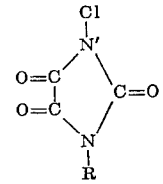

wherein R is selected from the group consisting of chlorine, hydrogen and hydroxymethyl.
2. N-chloroparabanic acid.
3. N,N'-dichloroparabanic acid.
4. N-hydroxymethyl-N'-chloroparabanic acid.

References Cited

UNITED STATES PATENTS

| | | | |
|---|---|---|---|
| 2,392,505 | 1/1946 | Rogers | 260—309.5 |
| 2,920,997 | 1/1960 | Wolf et al. | 260—309.5 |

OTHER REFERENCES

Chalsty et al.: Chem. Abst., vol. 49, column 14680 (1955).

Corral et al.: Anales Assoc. Quim. Arg., vol. 52 (3–4) pages 251-2 (1964).

Steinbrink et al.: German Application 1,020,024 (KL. 12p10), November 1957.

Zimmer et al.: Jour. Amer. Chem. Soc., vol. 76, pages 3856-7 (1954).

HENRY R. JILES, *Primary Examiner.*

NATALIE TROUSOF, *Assistant Examiner.*

U.S. Cl. X.R.

8—107; 210—62; 252—8.6, 186; 149—109; 260—999